US007958722B2

United States Patent
Komiyama et al.

(10) Patent No.: US 7,958,722 B2
(45) Date of Patent: Jun. 14, 2011

(54) VALVE DEVICE AND SECONDARY AIR SUPPLY SYSTEM HAVING THE SAME

(75) Inventors: Tadashi Komiyama, Chiryu (JP); Satoshi Ishigaki, Takahama (JP); Takahiro Kouzu, Kariya (JP)

(73) Assignee: Denso Corporation, Kariya (JP)

( * ) Notice: Subject to any disclaimer, the term of this patent is extended or adjusted under 35 U.S.C. 154(b) by 756 days.

(21) Appl. No.: 11/934,941

(22) Filed: Nov. 5, 2007

(65) Prior Publication Data
US 2008/0110159 A1 May 15, 2008

(30) Foreign Application Priority Data
Nov. 15, 2006 (JP) ................................ 2006-309309

(51) Int. Cl.
*F01N 3/00* (2006.01)
(52) U.S. Cl. ............... 60/289; 60/276; 60/290; 60/291; 60/292; 137/315.03; 137/565.01; 137/565.13
(58) Field of Classification Search ............... 60/274, 60/276, 289, 290, 291, 292, 293; 137/315.03, 137/565.01, 565.11, 565.13, 565.18
See application file for complete search history.

(56) References Cited

U.S. PATENT DOCUMENTS

| 4,245,472 | A | * | 1/1981 | Miura ............................. 60/290 |
| 4,376,369 | A | * | 3/1983 | Horikoshi et al. ............... 60/276 |
| 5,140,810 | A | * | 8/1992 | Kuroda ........................... 60/274 |
| 5,852,929 | A | * | 12/1998 | Kato et al. ....................... 60/274 |
| 6,742,537 | B2 | * | 6/2004 | Martus et al. ............... 137/15.18 |
| 7,032,375 | B2 | * | 4/2006 | Tsuzuki et al. ................. 60/289 |
| 7,178,330 | B2 | * | 2/2007 | Kouzu et al. .................... 60/289 |
| 2005/0138919 | A1 | | 6/2005 | Nakano et al. |
| 2006/0048504 | A1 | | 3/2006 | Oi et al. |

FOREIGN PATENT DOCUMENTS
JP 2003-314262 11/2003
* cited by examiner

*Primary Examiner* — Binh Q. Tran
(74) *Attorney, Agent, or Firm* — Nixon & Vanderhye, PC

(57) ABSTRACT

A valve device includes a control valve for manipulating a communication between a first fluid channel and a second fluid channel. The valve device further includes a pressure sensor for detecting pressure in the first fluid channel. The pressure sensor is provided on a side face defining the first fluid channel. The pressure sensor has a pressure detection face directly opposed to the first fluid channel. The pressure detection face is substantially in parallel with a first axis of the first fluid channel.

15 Claims, 4 Drawing Sheets

VALVE DEVICE AND SECONDARY AIR SUPPLY SYSTEM HAVING THE SAME

CROSS REFERENCE TO RELATED APPLICATIONS

This application is based on and incorporates herein by reference Japanese Patent Application No. 2006-309309 filed on Nov. 15, 2006.

FIELD OF THE INVENTION

The present invention relates to a valve device having a pressure sensor. The present invention relates to a secondary air supply system for an engine and having the valve device.

BACKGROUND OF THE INVENTION

JP-A-2005-265482, JP-A-2003-314262, JP-A2006-070835, and JP-A-2005-256832, disclose valve devices each being applied to a secondary air supply system, as an example. The secondary air supply system leads fluid such as secondary air discharged from an air pump into an exhaust pipe upstream of a catalyst, which is provided for cleaning exhaust gas. In this operation, the secondary air supply system accelerates activation to warm up the catalyst by supplying the secondary air to the upstream of the catalyst for purifying exhaust gas.

The valve device includes a first fluid channel, a second fluid channel, a control valve, a check valve, and a pressure sensor. The first fluid channel is connected to a discharge port of the air pump. The second fluid channel is connected to the exhaust pipe in upstream of the catalyst. The control valve opens and closes a communication passage between the first and second fluid channels. The check valve restricts backflow of the exhaust gas toward the control valve through the second fluid channel. The pressure sensor detects pressure in the first fluid channel. The pressure sensor is used for detecting a malfunction or control of an air-fuel ratio.

In the detection of a malfunction, an operating condition of the air pump and a malfunction caused by seizure of the control valve are diagnosed based on a correlation between a driving condition of the air pump, an opening and closing condition of the control valve, and detected pressure of the pressure sensor. In the control of the air-fuel ratio, the amount of secondary air supplied from the air pump to upstream of the catalyst is calculated based on the detected pressure of the pressure sensor in order to properly maintain an air-fuel ratio of the catalyst.

As shown in FIG. 4, a pressure sensor J1 disclosed in JP-A-2005-265482 employs a structure where the pressure sensor is attached to a top of an electromagnetic solenoid J2 of a control valve for detecting pressure in a first fluid channel J3 extending through the interior of the electromagnetic solenoid J2. In this structure, pulsation in pressure in the first fluid channel J3 is transmitted to the pressure sensor J1 after being attenuated, and consequently, malfunction is hardly detected according to pulsation in pressure.

As shown in FIG. 5, a pressure sensor J1 disclosed in JP-A-2003-314262 employs a structure where pressure in a first fluid channel J3 is transmitted to the pressure sensor J1 through a conduction pipe J4. However, since the conduction pipe J4 is communicated with the axis of the first fluid channel J3, the pressure sensor J1 is easily affected by a flow of secondary air fed from an air pump.

Therefore, the pressure sensor J1 may be affected by a shock wave occurring in the first fluid channel J3, and consequently, an accuracy of pressure detected using the pressure sensor J1 becomes low.

SUMMARY OF THE INVENTION

In view of the foregoing and other problems, it is an object of the present invention to produce a valve device having a pressure sensor capable of accurately detecting pressure therein. It is another object of the present invention to produce a secondary air supply system having the valve device.

According to one aspect of the present invention, a valve device comprises a control valve for manipulating a communication between a first fluid channel and a second fluid channel. The valve device further comprises a pressure sensor for detecting pressure in the first fluid channel. The pressure sensor is provided on a side face defining the first fluid channel. The pressure sensor has a pressure detection face directly opposed to the first fluid channel. The pressure detection face is substantially in parallel with a first axis of the first fluid channel.

According to another aspect of the present invention, a secondary air supply system for an engine, comprises a catalyst provided in an exhaust pipe of the engine for purifying exhaust gas. The system further comprises an air pump for discharging secondary air to the exhaust pipe upstream of the catalyst. The system further comprises a valve device having a housing defining a first fluid channel, which is connected to a discharge port of the air pump, and a second fluid channel, which is connected to the exhaust pipe upstream of the catalyst. The valve device includes a control valve for manipulating a communication between the first fluid channel and the second fluid channel. The valve device includes further includes a pressure sensor for detecting pressure in the first fluid channel. The pressure sensor is provided on a side face defining the first fluid channel. The pressure sensor has a pressure detection face directly opposed to the first fluid channel. The pressure detection face is substantially in parallel with a first axis of the first fluid channel.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

An embodiment of a secondary air supply system mounted with a valve device is described with reference to FIGS. 1 to 3.

Figure 3:
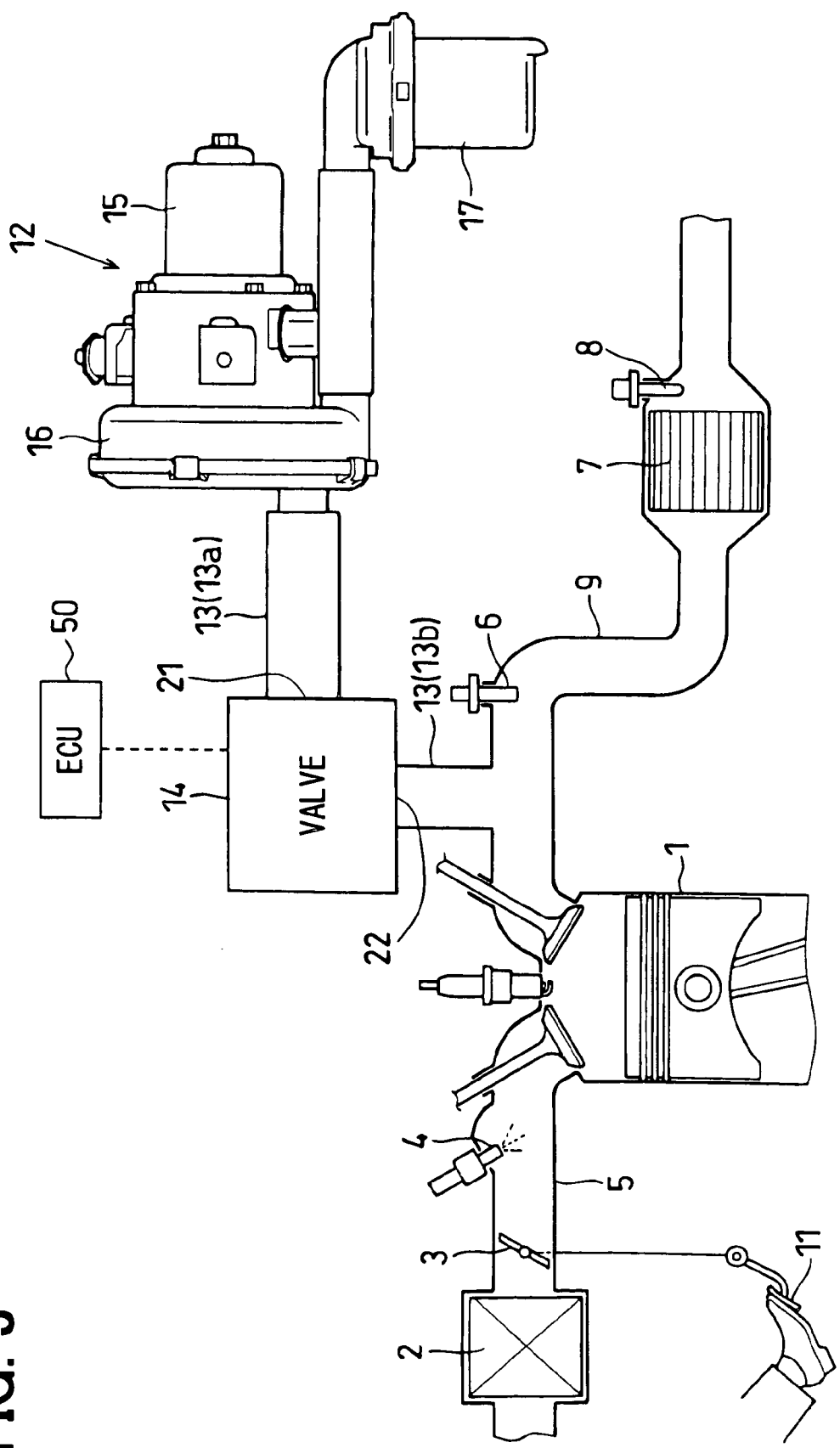
FIG. 3 is a schematic view showing a secondary air supply system including the valve device.
Figure 4:
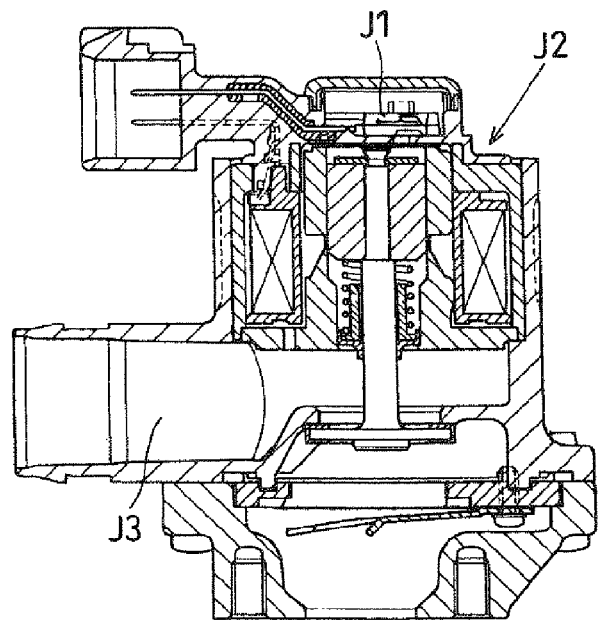
FIGS. 4, 5 are sectional views each showing a valve device according to prior arts.
Figure 5:
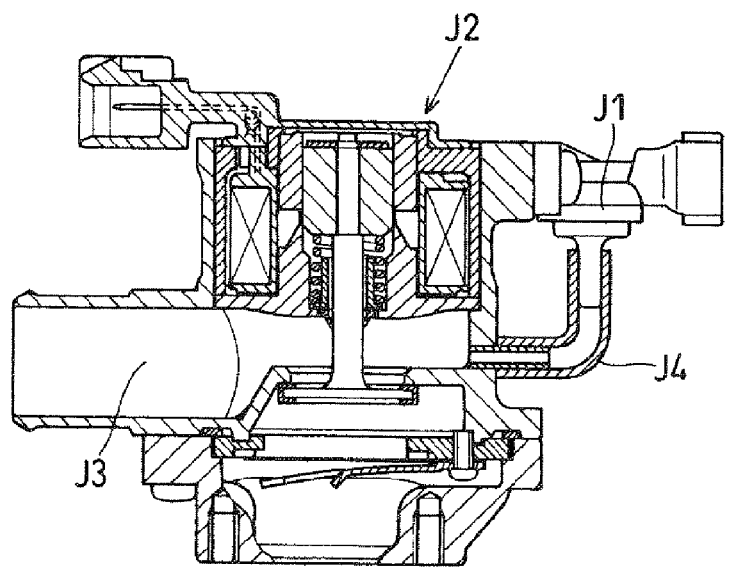

As shown in FIG. 3, a generally known engine 1 has an intake pipe 5 and an exhaust pipe 9. The intake pipe 5 is provided with an air cleaner 2, a throttle valve 3, an injector 4, and the like. The exhaust pipe 9 is provided with an $O_2$ sensor 6, a catalyst 7, a catalyst temperature sensor 8, and the like. The throttle valve 3 is set to define an opening depending on depression of an accelerator 11 operated by an occupant. The catalyst 7 accelerates a redox reaction of exhaust gas to purify the exhaust gas. The secondary air supply system is mainly intended to forcedly supply secondary air into the exhaust pipe 9 in upstream of the catalyst 7 to accelerate warming-up of the catalyst 7 in a cold starting of the engine 1.

The secondary air supply system includes an electromotive air pump 12, a secondary air pipe 13, and a valve device 14. The secondary air pipe 13 is provided for leading secondary air discharged from the electromotive air pump 12 to the exhaust pipe 9. The valve device 14 is provided midway through the secondary air pipe 13. The valve device 14 opens and closes the secondary air pipe 13.

The secondary air pipe 13 includes a secondary air upstream pipe 13a and a secondary air downstream pipe 13b. The secondary air upstream pipe 13a connects between the electromotive air pump 12 with the valve device 14. The secondary air downstream pipe 13b connects the valve device 14 with the exhaust pipe 9.

The electromotive air pump 12 is hermetically connected to an upstream end of the secondary air upstream pipe 13a. The electromotive air pump 12 has an electromotive motor 15 and a blower 16. The electromotive motor 15 generates rotational drive force by being supplied with electric power. The blower 16 is rotationally driven by the electromotive motor 15.

The blower 16 includes an impeller driven by the electromotive motor 15 and a blower case for covering the impeller. The impeller is, for example, a double-fan-type vortex impeller for pressure feed of air.

An air filter 17 is provided to an air inlet port of the electromotive air pump 12 for filtering air drawn by the blower 16. The air filter 17 may be provided outside the electromotive air pump 12 as shown in FIG. 3. Alternatively, the air filter 17 may be provided integrally with the electromotive air pump 12.

Figure 1:
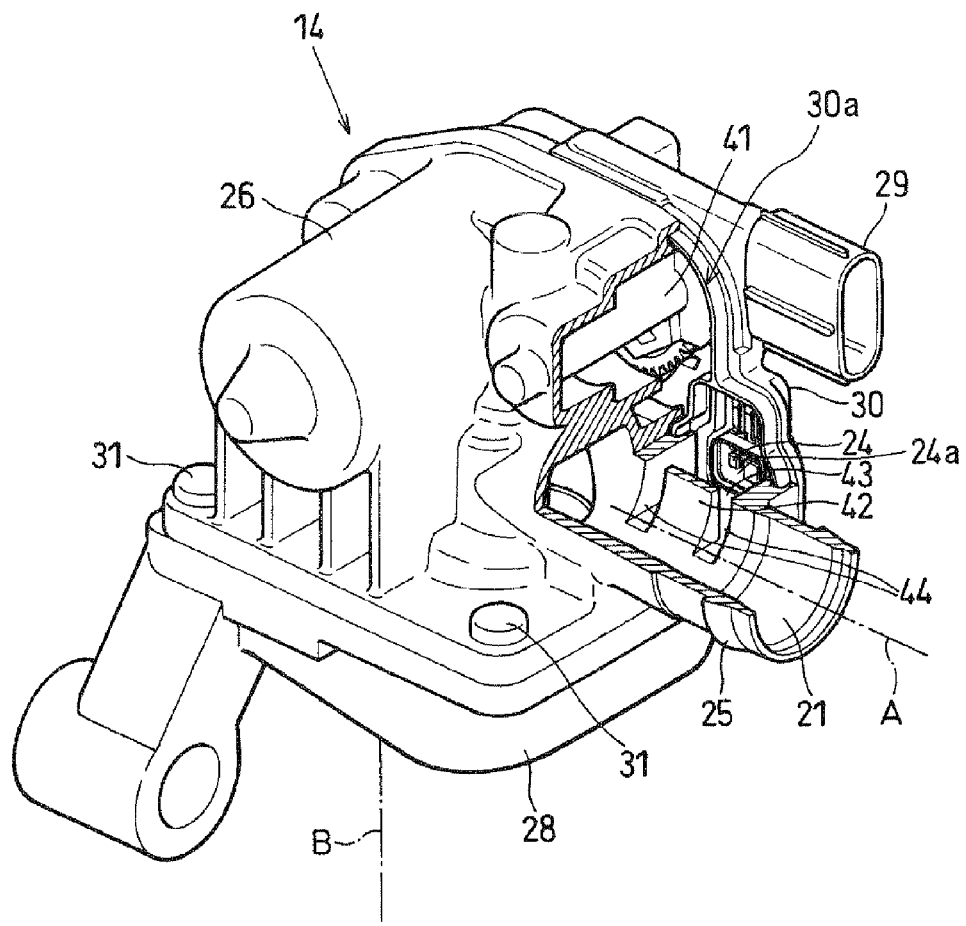
FIG. 1 is a perspective view showing a valve device.
Figure 2:
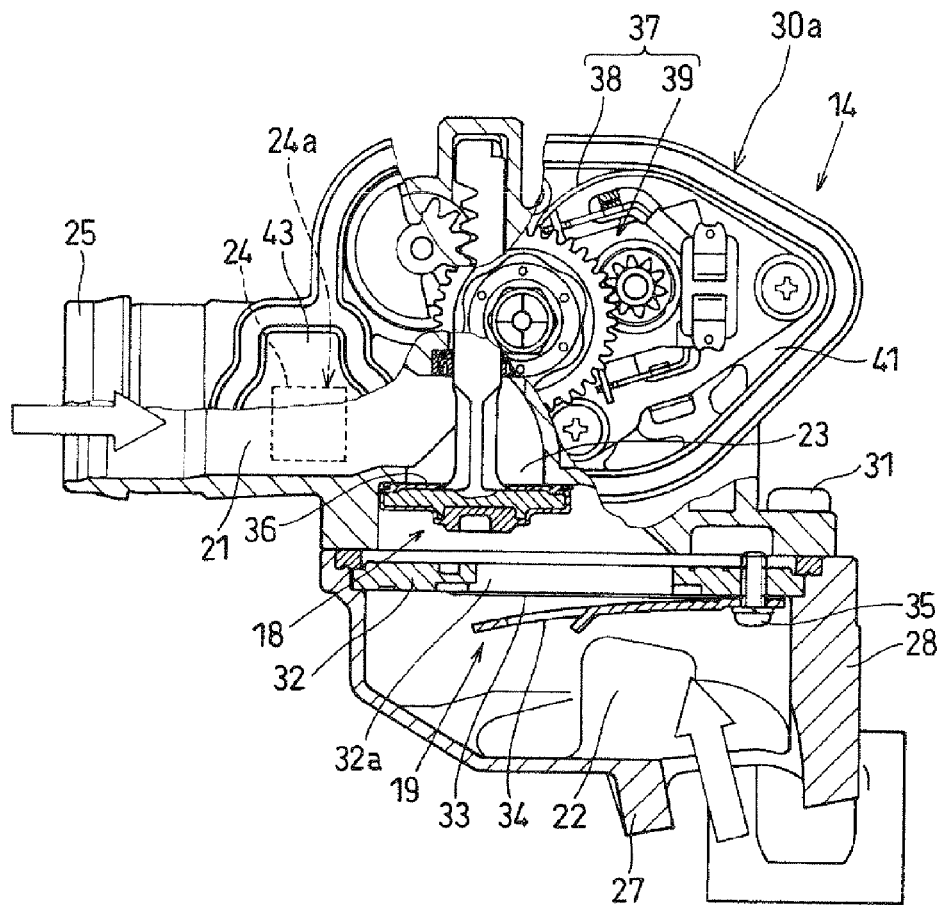
FIG. 2 is a sectional view showing the valve device taken along an imaginary plane.

As shown in FIGS. 1, 2, in this embodiment, the valve device 14 is a combination valve including a control valve 18 combined with a check valve 19. The control valve 18 opens and closes midway through the secondary air pipe 13 by electromotion. The check valve 19 restricts backflow of exhaust gas.

Specifically, the valve device 14 is hermetically connected between the secondary air upstream pipe 13a and the secondary air downstream pipe 13b. The valve device 14 includes a first fluid channel 21, a second fluid channel 22, the control valve 18, the check valve 19, and a pressure sensor 24. The first fluid channel 21 is connected to a discharge port of the electromotive air pump 12 via the secondary air upstream pipe 13a. The second fluid channel 22 is connected to the exhaust pipe 9 upstream of the catalyst 7 via the secondary air downstream pipe 13b. The control valve 18 opens and closes a communication passage (valve opening, FIG. 2) 23 between the first fluid channel 21 and the second fluid channel 22. The check valve 19 is provided in the second fluid channel 22 downstream of secondary air with respect to the valve opening 23. The pressure sensor 24 detects pressure in the first fluid channel 21.

The valve device 14 has a valve housing defining therein the valve opening 23. In the valve device 14, the first fluid channel 21 is located upstream of the valve opening 23, and the second fluid channel 22 is located downstream of the valve opening 23. The valve housing includes an upper housing 26, a lower housing 28, and a cover 30, which are combined with one another using a combination tool such as screws 31. The upper housing 26 has an inlet pipe 25 connected to the secondary air upstream pipe 13a. The inlet pipe 25 partially defines the first fluid channel 21. The lower housing 28 defines an outlet pipe 27 connected to the secondary air downstream pipe 13b. The outlet pipe 27 partially defines the second fluid channel 22. The cover 30 is attached with the pressure sensor 24. The cover 30 has a connector 29 formed thereon.

Seal members are provided at joint portions between the upper housing 26, the lower housing 28, and the cover 30, thereby securing airtightness therebetween.

First, the check valve 19 is described.

The check valve 19 is a metal lead valve mainly provided in the lower housing 28. The check valve 19 includes a metal plate 32, a sheet-spring metal lead 33, and a lead stopper 34. The metal plate 32 therein defines a passage port 32a for secondary air. The sheet-spring metal lead 33 is provided for opening and closing the passage port 32a of the metal plate 32. The lead stopper 34 is provided for restricting a maximum opening degree of the metal lead 33.

The metal plate 32 is clamped between the upper housing 26 and the lower housing 28, and thus held therebetween. The metal lead 33 and the lead stopper 34 are fixed to the metal plate 32 using a fixing member such as a screw 35. The metal lead 33 is provided to close the passage port 32a of the metal plate 32 in a no-loaded condition, by being applied with pressure of exhaust gas flowing backward from the exhaust pipe 9. In addition, the metal lead 33 opens the passage port 32a by being applied with pressure of secondary air discharged from the electromotive air pump 12.

Next, the control valve 18 is described. The control valve 18 is mainly provided in the upper housing 26. The control valve 18 includes a circular valve seat, which defines therein the valve opening 23 for passing the secondary air, a valve 36 for opening and closing the valve opening 23, and an electromotive actuator 37 for manipulating the valve 36.

The valve seat is formed integrally with the upper housing 26.

The valve 36 is a poppet valve including a valve cap (head) and a valve shaft (drive shaft). The valve cap is seated on the valve seat so that communication is shut off between the first fluid channel 21 and the second fluid channel 22. The valve cap is lifted from the valve seat, so that the first fluid channel 21 is communicated to the second fluid channel 22.

A seal member is provided on a seating face of the valve cap for restricting leakage of air in a condition wherein the valve cap is seated on the valve seat.

The electromotive actuator 37 opens and closes the valve opening 23 by driving the valve shaft of the valve 36 in a direction of a central axis of the shaft.

Specifically, the electromotive actuator 37 of the embodiment includes an electromotive motor 38 and a deceleration device 39. The electromotive motor 38 is supplied with an electric current, thereby generating rotational force. The deceleration device 39 transmits the rotational force of the electromotive motor 38 to the valve shaft while reducing rotation speed of the electromotive motor 38.

The electromotive motor 38 and the deceleration device 39 are accommodated in an actuator chamber 41 defined in the upper housing 26. The actuator chamber 41 is closed by the cover 30.

The connector 29, which is commonly used, is provided on the cover 30 for conducting an electric current to the electromotive actuator 37 and extraction of output of the pressure sensor 24. Current supply to the electromotive actuator 37 is controlled by Engine Control Unit (ECU) 50, and a detection signal by the pressure sensor 24 is sent to the ECU 50 via each of external connectors (not shown) connected to the connector 29.

The ECU 50 controls current supply to the electromotive air pump 12 and control valve 18 according to an operating condition of the engine 1 detected using respective sensors such as the pressure sensor 24. The ECU 50 includes a known computer having a CPU for performing various kinds of operation processing, and a storage device such as RAM or ROM for storing various programs or data. When the ECU 50 is turned on using a key switch, the ECU 50 performs control of current supply to the electromotive air pump 12 and control of opening and closing of the control valve 18 based on a program stored in the storage device and an operating condition of the engine 1 detected using the respective sensors.

The ECU 50 is installed with a normal control program for controlling a normal operation of a secondary air supply system, in addition, installed with a malfunction detection program (failure diagnosis function) for diagnosing of an operating condition of the electromotive air pump 12 and a malfunction caused by seizure of the control valve 18.

First, an example of the malfunction detection program is described.

The ECU 50 executes the following malfunction detection program every time before the secondary air supply system is normally operated according to the normal control program.

When an ignition switch is turned on or start of the engine 1 is confirmed, and temperature of the catalyst 7 detected using the catalyst temperature sensor 8 is not higher than a predetermined operation start temperature, first, the ECU 50 reads a detection signal of the pressure sensor 24 in a condition where the electromotive air pump 12 is stopped and the control valve 18 is closed.

Next, the ECU 50 operates the electromotive air pump 12 while the control valve 18 is closed, and the ECU 50 reads a detection signal of the pressure sensor 24. Next, the ECU 50 opens the control valve 18 while the electromotive air pump 12 is operated, and the ECU 50 reads a detection signal of the pressure sensor 24.

Next, the ECU 50 evaluates the above three kinds of detected pressure with reference to a data map defined in the malfunction detection program, and thus determines whether a malfunction occurs in the secondary air supply system.

Specifically, the ECU 50 evaluates the three kinds of detected pressure with reference to data defined in the data map, and thus diagnoses a malfunction of a connection of the secondary air upstream pipe 13a or the secondary air downstream pipe 13b, a malfunction of operation of the electromotive air pump 12, and a malfunction caused by seizure of the control valve 18.

When the ECU 50 determines no malfunction is found in the secondary air supply system through the execution of the malfunction detection program, the ECU 50 executes the normal control program.

The order of the three kinds of pressure detection may be changed, or only one or two of the three kinds of pressure detection may be performed for the malfunction detection. Alternatively, magnitude of pressure pulsation detected using the pressure sensor 24 may be used for the malfunction detection.

Next, an example of the normal control program is described.

In start of the engine 1, when the ECU 50 determines temperature of the catalyst 7 detected using the catalyst temperature sensor 8 not to be higher than the predetermined operation start temperature, and determines the secondary air supply system to be normal according to the failure diagnosis of the malfunction detection program, the ECU 50 operates the electromotive air pump 12, and opens the control valve 18.

Then, when the temperature of the catalyst 7 detected using the catalyst temperature sensor 8 becomes higher than a predetermined operation stop temperature, the ECU 50 stops the electromotive air pump 12, and closes the control valve 18, thereby terminating the operation of the secondary air supply system.

The normal control program may incorporate an air-fuel ratio control function. The air-fuel ratio control function calculates the amount of secondary air supplied from the electromotive air pump 12 to upstream of the catalyst 7 based on the detected pressure of the pressure sensor 24, and controls rotational frequency of the electromotive air pump 12 or the control valve 18 to appropriately keep the air-fuel ratio on the catalyst 7.

Moreover, the normal control program may incorporate a terminating function that terminates the operation of the secondary air supply system by determining a malfunction to occur in the secondary air supply system when the detection signal of the pressure sensor 24 is out of a predetermined pressure range during the normal operation of the secondary air supply system.

The valve device 14 of the embodiment has the following features.

(a) The control valve 18 is provided at an intersection between a first axis A of the first fluid channel 21 and a second axis B of the second fluid channel 22 respectively depicted by the dashed line in FIG. 1. The first axis A of the first fluid channel 21 is a center line of the inlet pipe 25. The second axis B of the second fluid channel 22 is a center line of the outlet pipe 27. The control valve 18 opens and closes the valve opening 23 at a boundary between the first fluid channel 21 and the second fluid channel 22.

(b) The pressure sensor 24 is provided on a side face of the first fluid channel 21.

Specifically, the pressure sensor 24 is attached to part of the cover 30 perpendicularly to the first axis A.

(c) The pressure sensor 24 has a pressure detection face 24a directly opposed to the first fluid channel 21. The pressure detection face 24a of the pressure sensor 24 is directly in contact with the secondary air in the first fluid channel 21.

(d) The pressure detection face 24a of the pressure sensor 24 is a plane surface. The pressure detection face 24a is substantially in parallel with the first axis A of the first fluid channel 21.

That is, the pressure detection face 24a of the pressure sensor 24 is substantially in parallel with a flow direction of the secondary air flowing through the first fluid channel 21.

(e) The pressure detection face 24a of the pressure sensor 24 is substantially in parallel with an imaginary plane including the first axis A and the second axis B. The pressure detection face 24a of the pressure sensor 24 is, for example, substantially in parallel with a plane defined by an x axis and a y axis assuming that the first axis A corresponds to the x axis, and the second axis B corresponds to the y axis.

FIG. 2 is a sectional view showing the valve device 14 taken along the imaginary plane.

(f) The pressure sensor 24 is attached to the cover 30 having the connector 29.

(g) The cover 30 has a face (largest face) 30a that is substantially in parallel with the imaginary plane including the first axis A and the second axis B. The pressure detection face 24a of the pressure sensor 24 is provided substantially parallel to the cover 30 along the face 30a of the cover 30.

The cover 30 may be attached to the housing 26 via the face 30a.

(h) The pressure sensor 24 has an electrical connector connected to the common connector 29. The common connector 29 also serves as a connector for current supply to the electromotive actuator 37 via a lead wire such as a film wiring provided on the cover 30.

(i) The valve device 14 has an opposed wall 42 substantially in parallel with the pressure detection face 24a of the pressure sensor 24.

(j) The pressure detection face 24a of the pressure sensor 24 and the opposed wall 42 therebetween define a space (pressure transmission chamber) 43 communicated with the first fluid channel 21 through openings 44.

The above features are specifically explained.

The pressure sensor 24 is attached to the cover 30. The inlet pipe 25 of the upper housing 26 partially defines therein the pressure transmission chamber 43 for leading the secondary air from the first fluid channel 21 to the pressure detection face 24a of the pressure sensor 24.

The pressure transmission chamber 43 is a concavity defined in the first fluid channel 21. A partition wall is provided between the pressure transmission chamber 43 and the actuator chamber 41 adjacent to the pressure transmission chamber 43, and the partition wall partitions the actuator chamber 41 from the pressure transmission chamber 43.

A part of the upper housing 26 defines the opposed wall 42 at a position opposed to the pressure detection face 24a of the pressure sensor 24 in the pressure transmission chamber 43. The opposed wall 42 is substantially in parallel with the first axis A of the first fluid channel 21, and substantially in parallel with the pressure detection face 24a of the pressure sensor 24. The secondary air is led into the pressure transmission chamber 43 through two openings 44 respectively provided upstream and downstream of the opposed wall 42.

Thus, the pressure transmission chamber 43, in which the pressure detection face 24a is provided, is directly communicated with the first fluid channel 21, and thus the secondary air in the first fluid channel 21 is directly transferred to the pressure detection face 24a of the pressure sensor 24.

The valve device 14 of the embodiment has the above features, thereby producing the following advantages.

As described in the above clause (c), since the pressure detection face 24a of the pressure sensor 24 is directly opposed to the first fluid channel 21 so as to directly in contact with the secondary air in the first fluid channel 21, the pressure sensor 24 is capable of detecting pressure in the first fluid channel 21 at high sensitivity. That is, the pressure sensor 24 is capable of detecting pressure pulsation in the first fluid channel 21 at high accuracy.

As described in the above clause (d), since the pressure detection face 24a of the pressure sensor 24 is substantially in parallel with the first axis A of the first fluid channel 21, even when an impact wave occurs in the first fluid channel 21, the pressure detection face 24a of the pressure sensor 24 is oriented in a direction perpendicular to a wave front of the impact wave.

Therefore, the pressure detection face 24a of the pressure sensor 24 can be protected from the wave front of the shock wave.

Thus, since the pressure sensor 24 is hardly affected by the shock wave, detection accuracy of pressure can be maintained, even when a shock wave occurs in the first fluid channel 21. Consequently, accuracy of malfunction detection, or accuracy of control of air-fuel ratio can be improved.

As described in the above clause (e), the pressure detection face 24a of the pressure sensor 24 is substantially in parallel with the imaginary plane including the first axis A and the second axis B, thereby the pressure detection face 24a of the pressure sensor 24 is substantially in parallel with the first axis A of the first fluid channel 21.

As described in the above clause (g), the face 30a of the cover 30 is substantially in parallel with the imaginary plane, so that the valve device 14 is reduced in thickness, and enhanced in volume efficiency.

Moreover, as described in the above clause (g), since the pressure detection face 24a of the pressure sensor 24 is provided substantially in parallel with the cover 30 along the face 30a of the cover 30, the pressure detection face 24a can be oriented in a desired direction substantially in parallel with the imaginary plane.

As described in the above clause (h), since the connector 29 for the pressure sensor 24 also serves for electrical communication with the electromotive motor 38, the number of the connector 29 can be reduced to be one in the valve device 14, consequently the valve device can be improved in mountability to a vehicle.

As described in the above clauses (i) and (j), the opposed wall 42 is provided to be substantially in parallel with the pressure detection face 24a of the pressure sensor 24. In addition, the pressure transmission chamber 43 defined between the pressure detection face 24a of the pressure sensor 24 and the opposed wall 42 is directly communicated with the first fluid channel 21 through the two openings 44. In this structure, the effect of the shock wave on the pressure detection face 24a of the pressure sensor 24 can be further reduced.

Modifications

While the electromotive actuator 37 formed by combining the electromotive motor 38 and the deceleration device 39 was described as an example of an actuator of the control valve 18 in the embodiment, other actuators such as an electromagnetic actuator may be provided for directly driving the valve 36 in an axial direction.

While an example in which the valve device 14 is applied to the secondary air supply system for supplying secondary air to the catalyst 7 was described in the embodiment, a fluid is not limited to secondary air, and the structure described above may be applied to other valve devices.

For example, the above structure may be applied to a valve device that controls opening and closing of a hydrogen channel or controls a hydrogen flow rate.

While an example that an upstream of a supply fluid such as secondary air was made as a first fluid channel was described in the embodiment, the first fluid channel may be in a downstream of the supply fluid depending on application of the valve device.

That is, the above structure may be applied to a valve device where pressure downstream of the control valve 18 is detected using the pressure sensor 24.

The above processings such as calculations and determinations are not limited being executed by the ECU 50. The control unit may have various structures including the ECU 50 shown as an example.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A valve device comprising:
   a control valve for manipulating a communication between a first fluid channel and a second fluid channel;
   a pressure sensor for detecting pressure in the first fluid channel; and
   an inlet pipe partially defining the first fluid channel and partially defining a pressure transmission chamber for leading fluid from the first fluid channel to a pressure detection face of the pressure sensor through an opening,
   wherein the pressure sensor is provided on a side face of the inlet pipe partially defining the first fluid channel,
   the pressure detection face is directly opposed to the first fluid channel,
   the pressure detection face is substantially in parallel with a first axis (A) of the first fluid channel, which first axis (A) is a center line of the inlet pipe,
   the control valve is provided at an intersection between the first axis (A) of the first fluid channel and a second axis (B) of the second fluid channel, and
   the pressure detection face is substantially in parallel with an imaginary plane including the first axis (A) and the second axis (B).

2. The valve device according to claim 1, further comprising:
   a housing that defines the first and second fluid channels;
   a cover removable relative to the housing; and
   an electromotive actuator for manipulating the control valve,
   wherein the cover has a connector for conducting an electric current to the electromotive actuator,
   the cover has a face, which is largest in the cover, and
   the face is substantially in parallel with the imaginary plane in a condition where the cover is attached to the housing.

3. The valve device according to claim 2,
   wherein the pressure sensor is provided on the cover, and
   the pressure detection face is substantially in parallel with the face of the cover.

4. The valve device according to claim 1, further comprising:
   an opposed wall substantially in parallel with the pressure detection face of the pressure sensor,
   wherein the pressure detection face of the pressure sensor and the opposed wall therebetween define a space of the pressure transmission chamber communicated with the first fluid channel via the opening.

5. The valve device according to claim 1, provided in a secondary air supply system that leads secondary air discharged from an air pump to an exhaust pipe in an upstream of a catalyst for purifying exhaust gas,
   wherein the first fluid channel is connected to a discharge port of the air pump, and
   the second fluid channel is connected to the exhaust pipe upstream of the catalyst.

6. The valve device according to claim 2, wherein the cover is attached to the housing via the face.

7. A secondary air supply system for an engine, the system comprising:
   a catalyst provided in an exhaust pipe of the engine for purifying exhaust gas;
   an air pump for discharging secondary air to the exhaust pipe upstream of the catalyst; and
   a valve device having a housing defining a first fluid channel, which is connected to a discharge port of the air pump, and a second fluid channel, which is connected to the exhaust pipe upstream of the catalyst,
   wherein the valve device includes a control valve for manipulating a communication between the first fluid channel and the second fluid channel,
   the valve device further includes a pressure sensor for detecting pressure in the first fluid channel,
   the valve device further includes an inlet pipe partially defining the first fluid channel and partially defining a pressure transmission chamber for leading secondary air from the first fluid channel to a pressure detection face of the pressure sensor,
   the pressure sensor is provided on a side face defining the first fluid channel,
   the pressure detection face is directly opposed to the first fluid channel,
   the pressure detection face is substantially in parallel with a first axis (A) of the first fluid channel, which first axis (A) is a center line of the inlet pipe,
   the control valve is provided at an intersection between the first axis (A) of the first fluid channel and a second axis (B) of the second fluid channel, and
   the pressure detection face is substantially in parallel with an imaginary plane including the first axis (A) and the second axis (B).

8. The system according to claim 7, further comprising:
   a controller adapted to control an electric current supplied to an electromotive actuator of the valve device for actuating the control valve in accordance with a detection signal of the pressure sensor.

9. The system according to claim 7, wherein the controller is adapted to control an electric current supplied to the air pump in accordance with a detection signal of the pressure sensor.

10. The system according to claim 7, wherein the controller is adapted to control an air fuel ratio of the engine in accordance with a detection signal of the pressure sensor.

11. The system according to claim 7, wherein the controller is adapted to diagnose a malfunction of at least one of the valve device and the air pump in accordance with a detection signal of the pressure sensor.

12. The valve device according to claim 1, wherein the first fluid channel extends straight along the first axis (A) to pass by the opening.

13. The valve device according to claim 12, wherein the pressure transmission chamber is a concavity defined in the inlet pipe partially defining the first fluid channel.

14. The secondary air supply system according to claim 7, wherein the first fluid channel extends straight along the first axis (A) to pass by the opening.

15. The secondary air supply system according to claim 14, wherein the pressure transmission chamber is a concavity defined in the inlet pipe partially defining the first fluid channel.

* * * * *